United States Patent
Moosh et al.

(10) Patent No.: US 9,867,386 B2
(45) Date of Patent: Jan. 16, 2018

(54) SYSTEM AND METHOD FOR MAKING CAMPFIRE MARSHMALLOW CANDY

(71) Applicants: Michael T Moosh, Township, MI (US); Michael V. Moosh, Township, MI (US); Marc J. Moosh, Township, MI (US)

(72) Inventors: Michael T Moosh, Township, MI (US); Michael V. Moosh, Township, MI (US); Marc J. Moosh, Township, MI (US)

(73) Assignees: Michael T. Moosh, Township, MI (US); Michael V. Moosh, Township, MI (US); Mark J. Moosh, Township, MI (US)

( * ) Notice: Subject to any disclaimer, the term of this patent is extended or adjusted under 35 U.S.C. 154(b) by 0 days.

(21) Appl. No.: 15/610,818

(22) Filed: Jun. 1, 2017

(65) Prior Publication Data

US 2017/0325476 A1    Nov. 16, 2017

Related U.S. Application Data

(62) Division of application No. 15/153,423, filed on May 12, 2016, now abandoned.

(51) Int. Cl.
*A23G 3/52*    (2006.01)
*A23G 3/34*    (2006.01)

(52) U.S. Cl.
CPC .............. *A23G 3/52* (2013.01); *A23G 3/0044* (2013.01); *A23G 3/0048* (2013.01); *A23V 2002/00* (2013.01)

(58) Field of Classification Search
CPC ........................................................ A23G 3/52
(Continued)

(56) References Cited

U.S. PATENT DOCUMENTS 4,415,595 A    11/1983   Takemori et al.
4,785,551 A    11/1988   Meyer
(Continued)

OTHER PUBLICATIONS

Mom With a Prep.com, blog on How to Dehydrate Marshmallows, [online]. Mar. 24, 2015, [retrieved Apr. 14, 2016]. Retrieved from the internet: <http://momwithaprep.com/dehydrate-marshmallows/>pp. 1-7.

(Continued)

*Primary Examiner* — Kelly Bekker
(74) *Attorney, Agent, or Firm* — Mark Malek; Widerman Malek, PL (57) ABSTRACT

A method for making campfire marshmallow candy, defined as crispy snacks derived from marshmallows and having a toasted marshmallow flavor. The method includes receiving a substantially single layer of marshmallows onto a reception tray. A dehydration unit removes moisture from the marshmallows at approximately 140 degrees Fahrenheit for between 8- and 24 hours, resulting in the marshmallows taking on approximately 80% of their original weight. The dehydrated marshmallows are cooled before a toasting unit toasts the marshmallows on one side. After a second cooling, the marshmallows are flipped and toasted again at a high heat of approximately 500 degrees Fahrenheit. After a third cooling, the marshmallows are dehydrated again before being cooled to create a candy that may be crushed to powder form. Each cooling brings the marshmallow product to a temperature between 55 and 85 degrees Fahrenheit. The resultant candy may be vacuum packaged.

10 Claims, 3 Drawing Sheets

(58) Field of Classification Search
USPC ........................................................ 426/571
See application file for complete search history.

(56) References Cited

U.S. PATENT DOCUMENTS

| | | | |
|---|---|---|---|
| 5,342,635 A * | 8/1994 | Schwab | A23C 9/1315 426/241 |
| 5,429,830 A | 7/1995 | Janovsky et al. | |
| 6,090,433 A | 7/2000 | Sterner et al. | |
| 6,376,003 B1 | 4/2002 | Cross | |
| 6,387,432 B1 | 5/2002 | Zietlow et al. | |
| 6,800,312 B1 | 10/2004 | Biggs | |
| 6,877,232 B2 | 4/2005 | Harmon et al. | |
| 7,175,870 B2 | 2/2007 | Layous et al. | |
| 8,105,642 B2 | 1/2012 | Shimek et al. | |
| 8,156,859 B2 | 4/2012 | Leason et al. | |
| 8,387,519 B2 | 3/2013 | McGuigan | |
| 8,505,444 B2 | 8/2013 | McGuigan | |
| 8,790,739 B2 | 7/2014 | Shimek et al. | |
| 2004/0142092 A1 | 7/2004 | Long | |

OTHER PUBLICATIONS

Wikipedia.org, Webpage on the Origins of Marshmallow, [online]. Apr. 27, 2016, [retrieved Apr. 21, 2016]. Retrieved from internet: <http://en.wikipedia.org/wiki/Marshmallow> p. 1.
Falcon et al., "Dehydrated Marshmallows in Oven?" Aug. 2012, (3 Pages) <https://www.reddit.com/r/cooking/comments/n28rx/dehydrating_marshmallows_in_oven/>.
Honey, "Dehydrated Marshmallows" Honey Bee Hive, Jan. 2013, (4 Pages) <http://hiveofthehoneybee.blogspot.com/2013/01/dehydrated-marshmallows.html>.
USPTO, "Non-Final Office action for related U.S. Appl. No. 15/153,423" dated Sep. 2, 2016 (13 Pages).
Applicant, "Response to Non-Final Office Action for related U.S. Appl. No. 15/153,423" Dec. 1, 2016 (12 Pages).
USPTO, "Final Office Action for related U.S. Appl. No. 15/153,423" dated Dec. 27, 2016 (12 Pages).
Linda. "Dehydrating Way Beyond Jerky", Nov. 26, 2012, <http://dehydratingwaybeyondjerky.blogspot.com/2012/11/marshmallows- . . . > (5 Pages).

* cited by examiner

SYSTEM AND METHOD FOR MAKING CAMPFIRE MARSHMALLOW CANDY

RELATED APPLICATIONS

This application is a divisional application of U.S. patent application Ser. No. 15/153,423 filed by the inventor of the present application on May 12, 2016, and titled System and Method for Making Campfire Marshmallow Candy, the entire content of which is incorporated herein by reference.

FIELD OF THE INVENTION

The present invention relates generally to food products and, more specifically, to systems and methods for creating a snack food version of a popular food product that maintains the general shape and desired characteristics of the popular food product.

BACKGROUND

A marshmallow is a sugar-based confection that, in its modern form, typically consists of sugar, water and gelatin whipped to a spongy consistency, molded into small cylindrical pieces, and coated with corn starch. Some marshmallow recipes call for eggs. Commercially-available marshmallows are commonly prepared by the aeration of mixtures of sucrose and proteins to a final density of about 0.5 g/ml. The proteins, and gelatin or egg albumin, prevent the collapse of air-filled cells.

This confection is the modern version of a medicinal confection made from *Althaea officinalis*, the marshmallow plant. The use of marshmallow to make sweets dates back to ancient Egypt, where the recipe called for extracting sap from the plant and mixing it with nuts and honey. Another pre-modern recipe uses the pith of the marshmallow plant, rather than the sap. The stem was peeled back to reveal the soft and spongy pith, which was boiled in sugar syrup and dried to produce a soft, chewy confection.

A milestone in the development of the modern marshmallow was the extrusion process by the American Alex Doumak in 1954. Marshmallow mixture is pumped through extrusion heads with numerous ports aligned next to each other which form long continuous "ropes" of marshmallow. This invention allows marshmallows to be manufactured in a fully automated way and produces the familiar cylindrical shape of today's marshmallow. In modern marshmallow processing plants, the following process may be used to make marshmallows in large quantities:

In large industrial kettles, water, sugar, and corn syrup are heated to a precise temperature and cooked for a precise time. This mixture is then pumped to another kettle to cool. Rehydrated gelatin is added and blended in once the mixture has cooled enough to not "kill" the gelatin. To give the marshmallow its fluffiness, it is pumped through a blender while air is pumped into it. At this point, it still needs to be cooled down further, so it will hold its shape when extruded. The mixture is pumped through a heat exchanger prior to being pumped through the extrusion heads and onto a wide conveyor belt. The conveyor belt is coated in corn starch and more corn starch is dusted onto the top of the marshmallow extrusion as it passes down the conveyor. A large knife the width of the conveyor is located at the end of this conveyor table that will then chop the extrusion into the size marshmallow desired. The pieces will then be tumbled in corn starch in a large drum in order for the marshmallow to form its familiar skin and allow pieces that did not get cut all the way to break apart.

Currently, marshmallows are predominantly used in food-type recipes (e.g., baking recipes, making cookies, cake frostings, cooked treats such as s'mores and Rice Krispies® treats. To facilitate shipping and storage, marshmallows of various sizes (regular and miniatures) are typically packaged in sealed plastic bags. Unfortunately, marshmallows lose their freshness over several weeks in today's packaging.

A popular camping or backyard tradition in the United Kingdom, North America, New Zealand and Australia is the toasting of marshmallows over a campfire or other open flame. A marshmallow is placed on the end of a stick or skewer and held carefully over the fire. This creates a caramelized outer skin with a liquid, molten layer underneath. According to individual preference, the marshmallows are heated to various degrees—from gently toasted to a charred outer layer. Often, the latter is achieved by igniting the marshmallow. The toasted marshmallow can either be eaten whole or the outer layer can be removed and consumed separately and the rest of the marshmallow toasted again.

An opportunity exists to expand consumer marketability of the marshmallow into a new category: stand-alone candy treat. More specifically, a need exists for a marshmallow product that exhibits the popular and familiar characteristics of marshmallows toasted over a campfire. Such a product should be snack-sized for ease of packaging and consumption. Such a product also should be characterized by an extended shelf-life both during shipping and market display. Such a product should also stand up to typical food product handling without losing its process-acquired form and appearance.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems and processes for transforming marshmallows into a type of snack-sized candy with a "campfire" toasted flavor. Such transformation of traditional marshmallow may advantageously expand the product's commercial usefulness to a consumer. The products of such systems and processes may advantageously be enjoyed similar to other stand-alone, handheld, bunched treats, such as roasted peanuts.

A method for making campfire marshmallow candy, defined as crispy and crunchy snacks derived from marshmallows (e.g., miniature marshmallows) and characterized by a toasted marshmallow flavor, comprises the steps of receiving a substantially single layer of marshmallows onto a reception tray. A dehydration unit dries the marshmallows at approximately 140 degrees Fahrenheit for between 8 and 24 hours to remove moisture, resulting in the marshmallows taking on approximately 80% of the marshmallows' original weight. The dehydrated marshmallows are cooled before a toasting unit is used to toast the marshmallows on one side. After a second cooling, the marshmallows are flipped and toasted again. Toasting is at a high heat of approximately 500 degrees Fahrenheit. After a third cooling, the marshmallows are dehydrated again before they are cooled a final time to create a candy that may be crushed to a powder state.

Each cooling brings the marshmallow product to a temperature between 55 and 85 degrees Fahrenheit. The campfire marshmallow candy may be packed and shipped in vacuum-sealed packaging.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a campfire marshmallow candy making system and associated methods according to an embodiment of the present invention. Throughout this disclosure, the present invention may be referred to as a campfire marshmallow candy system, a marshmallow candy system, a marshmallow toasting system, a mini-marshmallow candy system, an automated marshmallow candy production system, a marshmallow confection system, a confection system, a computer program product, a computer program, a product, a system, a device, and a method. Furthermore, the present invention may be referred to as relating to the implementation of a process for producing marshmallow-based candies. Those skilled in the art will appreciate that this terminology does not affect the scope of the invention. For instance, the present invention may just as easily relate to the production of any dehydrated and toasted confection.

Figure 1:
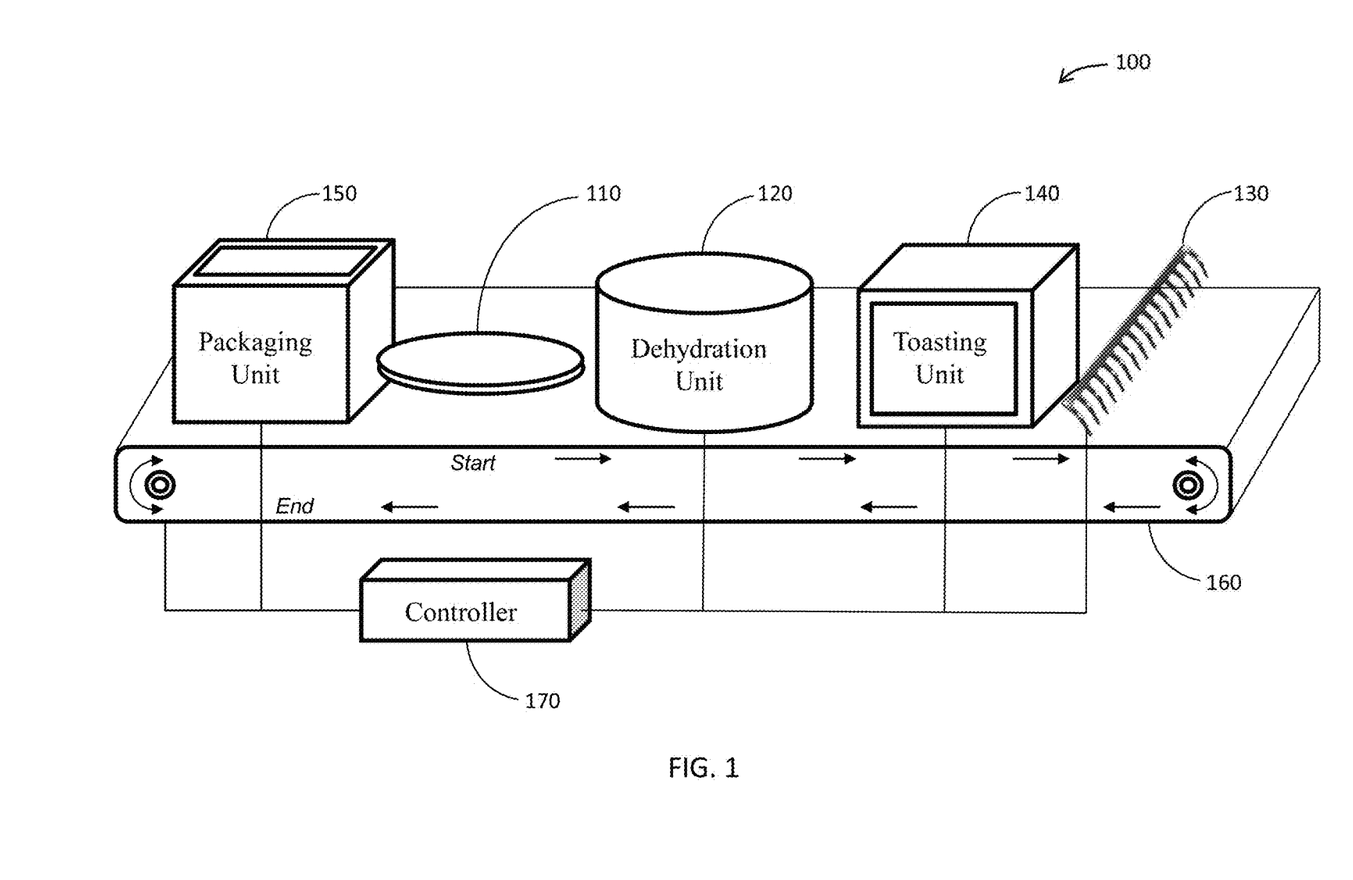
FIG. 1 is a schematic block diagram of campfire marshmallow candy production system according to an embodiment of the present invention.
Figure 2:
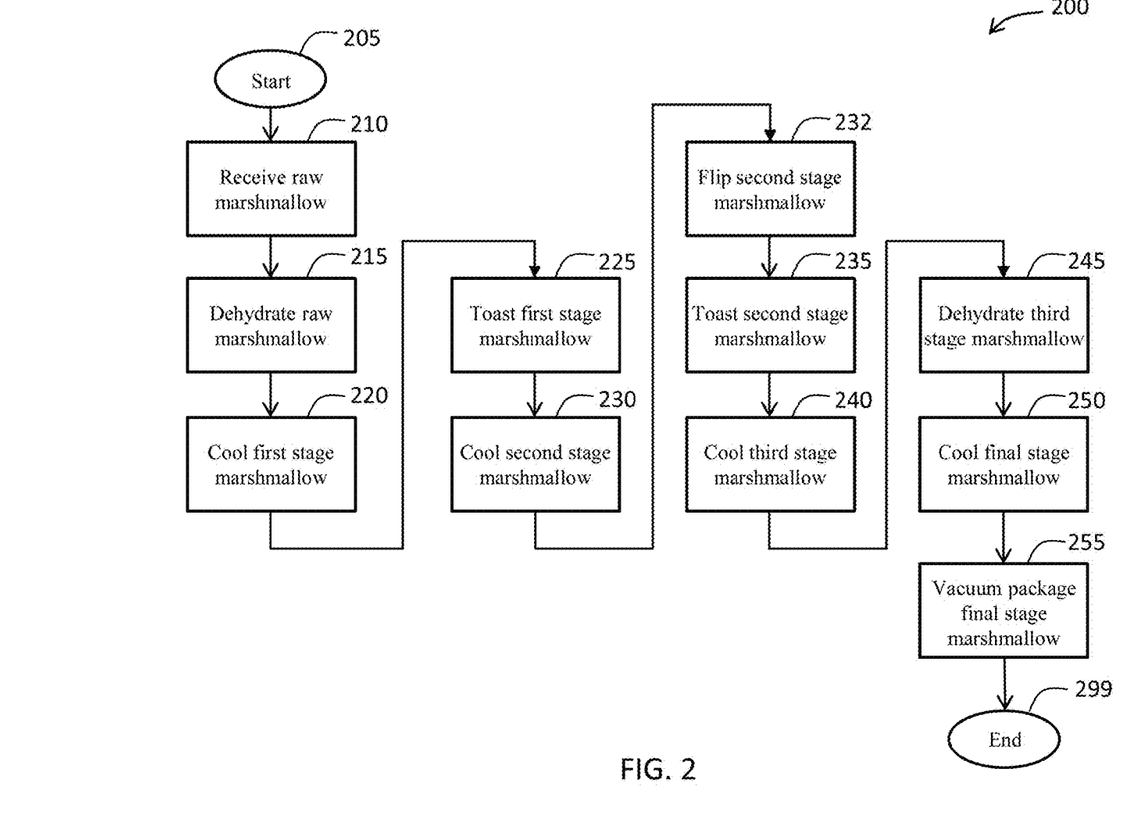
FIG. 2 is a flowchart illustrating a method of producing a campfire marshmallow candy according to an embodiment of the present invention.
Figure 3:
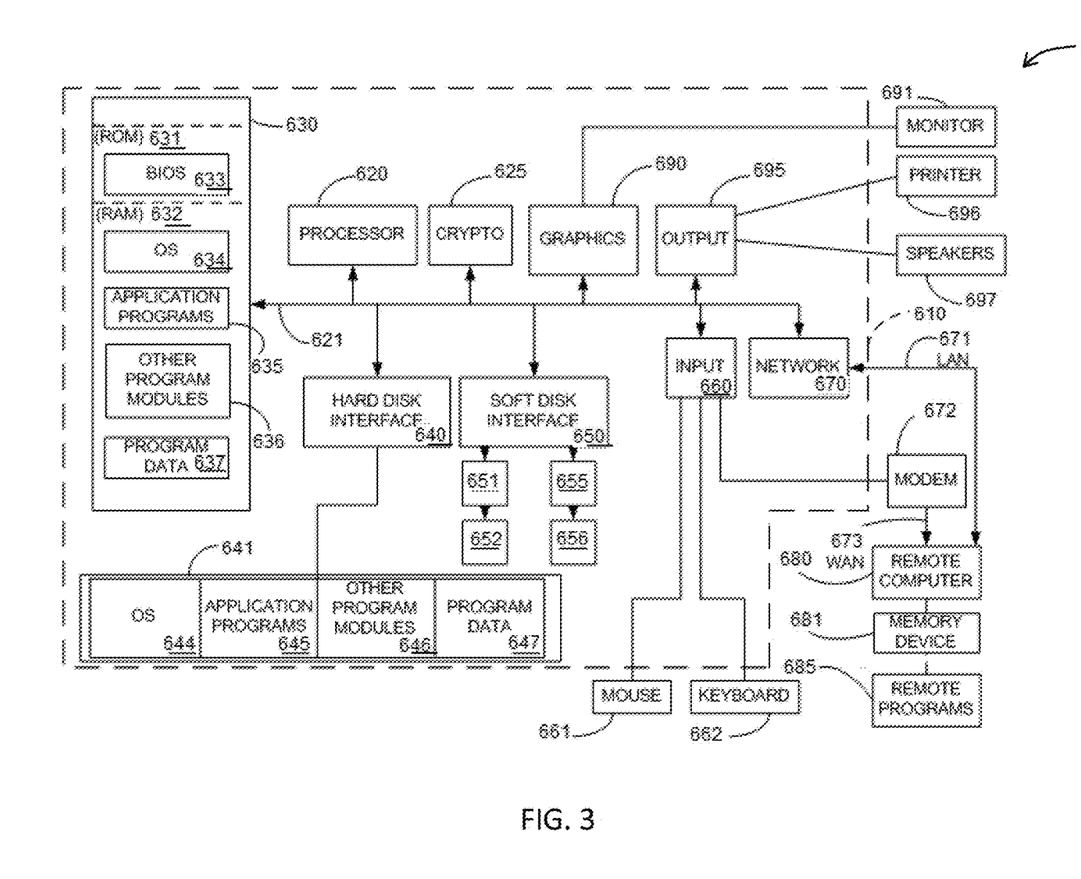
FIG. 3 is a block diagram representation of a machine in the example form of a computer system according to an embodiment of the present invention.

Referring to FIGS. 1-3, example methods and systems for a campfire marshmallow candy making system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation. Some of the illustrative aspects of the present invention may be advantageous in solving the problems herein described and other problems not discussed which are discoverable by a skilled artisan.

Referring now to FIG. 1, a campfire marshmallow candy making system 100 according to an embodiment of the present invention will now be discussed in greater detail. An embodiment of the invention, as shown and described by the various figures and accompanying text, provides a system 100 that may implement an automated method of automating the dehydration, toasting, and (optionally) packaging of a snack-sized candy. For example, and without limitation, the system 100, according to an embodiment of the present invention, may include a reception tray 110, a dehydration unit 120, a toasting unit 140, and a packaging unit 150. In a fully-automated embodiment of the present invention, a conveyor 160 may be operated to advance a product through employment of each the aforementioned components of the system 100, and also of a flipping unit 130. Operation of the functionality of the aforementioned components, as described hereinbelow (e.g., dehydration time settings of the dehydration unit 120, actuation settings of the flipping unit 130, toasting temperature of the toasting unit 140, transport speed of the conveyor 160, packaging actions of the packaging unit 150), may be controlled by a controller 170.

In one embodiment of the present invention, the reception tray 110 may include nonstick bakeware characterized by, for example, and without limitation, a nonstick cook surface mounted upon heavy-gauge steel that may advantageously resist warping and that may heat evenly without hot spots when used to bake and/or toast food products in an oven. The reception tray 110 may include raised edges to advantageously allow baking with no spill. Also for example, and without limitation, the reception tray 110 may advantageously be dishwasher-safe.

In another embodiment of the present invention, the dehydration unit 120 may include a food dehydrator characterized by, for example, and without limitation, plug-and-heat technology featuring a fan, an adjustable thermostat, and 500 watts of drying power that may advantageously preserve food quickly, at a user-defined temperature, and with low operating costs. The thermostat-controlled dehydration unit 120 may support drying temperatures between 95 and 155 degrees Fahrenheit. The dehydration unit 120 may be configured to receive the reception tray, and may optionally support tray rotation. Also for example, and without limitation, the dehydration unit 120 may expandable to receive a plurality of trays, including the reception tray 110. Also for example, and without limitation, an opaque exterior of the dehydration unit 120 may advantageously block nutrient-destroying light from reaching a food product within the unit 120.

In another embodiment of the present invention, the toasting unit 140 may include a toaster/broiler oven characterized by, for example, and without limitation, plug-and-heat technology featuring a fan, an adjustable thermostat, and between 3400 and 4000 watts of broiling power that may advantageously toast food quickly, at a user-defined temperature, and with minimal cleanup required. For example, and without limitation, the toasting unit 140 may be characterized by nonstick-coated interior oven walls. The thermostat-controlled toasting unit 140 may support toasting temperatures between 200 and 550 degrees Fahrenheit. The toasting unit 140 may be configured to receive the reception tray 110, and may optionally support tray rotation. Also for example, and without limitation, the toasting unit 140 may expandable to receive a plurality of trays, including the reception tray 110, each positionable below a respective toasting element of the toasting unit 140. Also for example, and without limitation, a tinted glass door of the toasting unit 140 may advantageously allow a user to check on food product in the toasting unit 140 without releasing heat.

In another embodiment of the present invention, the packaging unit 150 may include a vacuum seal system configured to remove air from a food storage bag to advantageously allow the atmosphere internal to the bag to be retained so enclosed food product may stay fresh and safe. For example, and without limitation, the packaging unit 150 may be characterized by a vacuum sealing channel, a latch bar, and a dishwasher-safe drip tray. Each food storage bag of the packaging unit 150 may be configured to receive food product from the reception tray 110.

In another embodiment of the present invention, full automation of the method of making campfire marshmallow candy (as described in more detail below) may be achieved by adding the flipping unit 130, the conveyor 160, and/or the controller 170. For example, the conveyor 160 may comprise a rubber conveyor belt similar to the type commonly used during commercial marshmallow extrusion process on which a rope of marshmallow pillows is cut and dried. Alternatively, or in addition, the conveyor 160 may include mechanisms for delivering to and retrieving from the aforementioned units 120, 130, 140, 150 the product-carrying reception tray 110. For example, and without limitation, the flipping unit 130 may be positioned along the conveyor 160 between two toasting components (or, as illustrated, between two uses of the same toasting unit 140) so as to cause a substantially single layer of product carried by the reception tray 110 to be substantially inverted between separate toasting events. The controller 170 may be configured in operational communication (e.g., electrical and/or mechanical) with other system 100 components 120, 130, 140, 150, 160, and may operate to coordinate the timing of the interdependent functions of the other system 100 components 120, 130, 140, 150, 160.

As illustrated in FIG. 1, for example, and without limitation, the controller 170 may operate the conveyor 160 to advance the product-carrying reception tray 110, from the Start, through first executions of the dehydration unit 120 and the toasting unit 140, in turn. After subsequent advancement of the reception tray 110 through the flipping unit 130, the controller 170 may operate the conveyor 160 to reverse direction to reversedly advance inverted product on the reception tray 110 through second executions of the toasting unit 140 and the dehydration unit 120, in turn. A person of skill in the art will immediately recognize that a reversible conveyor 160 that facilitates reuse of the same equipment (specifically, the dehydration unit 120 and/or the toasting unit 140) to satisfy multiple product processing steps may advantageously result in equipment investment savings. The controller 170 may then operate the conveyor 160 to reversedly advance to the End and, optionally, to operate the packaging unit 150 to prepare finished and separated product for shipping and storage.

Referring now to FIG. 2, and continuing to refer to FIG. 1, a method aspect of the present invention is described in detail. For example, and without limitation, the method 200 may include a multi-step process that may advantageously transform a known food item in the form of a marshmallow (e.g., traditional marshmallow like that marketed by Kraft® as Jet-Puffed® miniature marshmallows) into a snack-sized candy treat. More specifically, execution of the method 200 described herein may advantageously cause a marshmallow to take on a crunchy candy like texture, to deliver a well-known and popular "campfire" roasted flavor, and to retain the original character (e.g., shape, appearance) of the marshmallow.

Generally speaking, the method for creating a crunchy campfire roasted marshmallow product may include dehydrating commercially-available marshmallows to remove moisture prior to roasting. Such dehydration may advantageously allow for flavor roasting to be performed without turning the end product into a gooey unmanageable texture. Dehydration to a low moisture content also may advantageously increase product crispiness and may facilitate improved flavor during the roasting process.

During the roasting process, a dehydrated marshmallow may be subjected to high heat in order to advantageously impart fire-toasted flavor and color. Flipping (for example, and without limitation, by rotating, shaking, and/or vibrating the product) may expose multiple surfaces to the applied heat and may cause some portion of the exterior surface of the marshmallow to become golden brown in color and to take on a toasted flavor. An additional dehydration step may be performed after roasting to advantageously remove any moisture content resulting from the toasting process(es), and to further enhance the toasted flavor. This second dehydration may also advantageously extend the shelf life of the end product.

Toasted and dehydrated marshmallows may be put in a vacuum-sealed package to advantageously retain their freshness longer. For example, and without limitation, packaging may be sized for individual portions (like a candy) or for bulk portions. Vacuum packing, in combination with the resultant firm structure of the candies themselves, may advantageously present an easily stacked, stored, and shipped product with longer shelf life than the original marshmallow from which the candy may be created.

From the start at Block 205, an initial material in the form of a commercial marshmallow product, such as miniature marshmallows (measuring approximately $\frac{1}{2}"\times\frac{1}{2}"$, 12.7 mm×12.7 mm) may be received (Block 210). For example, and without limitation, the marshmallow product may be placed on the reception tray 110 in a single layer. At Block 215, the marshmallow product on the reception tray 110 may be placed in the dehydration unit 120 and dehydrated to a dried confection by drying at a temperature of approximately 140 degrees Fahrenheit. For example, and without limitation, the marshmallows on the reception tray 110 may be dried to approximately 80 percent of their original manufactured weight. The drying process may take 8-24 hours depending on ambient temperature and humidity influence. For example, and without limitation, an 8-12 hour drying time may be sufficient to support the process herein if carried out, for example, during times and/or at locations of low humidity (e.g., under 56 percent). Approximately 16 hours of drying time may be sufficient when carrying out the process herein in higher humidity of 56-62 percent.

At Block 220, the initially dehydrated product, defined as a first stage marshmallow, may be allowed to cool to advantageously set shape before toasting. More specifically, after drying at Block 215, the first stage marshmallows may be soft and deformable. Cooling the product to room temperature may advantageously allow the marshmallow to harden to a confection that may be readied for toasting.

At Block 225, the first-stage marshmallows may be placed in the toasting unit 140 and toasted under high heat (e.g. 500 degrees Fahrenheit) for a short time until the desired toasted state may be reached. Toasting may be achieved using radiant, convection, and/or other heat sources suitable for toasting (e.g. broiler). The marshmallows may be toasted on one side to allow the other, non-heated side to stabilize the marshmallow volume and prevent shape distortion. The product may at this stage of creation may be defined as a second stage marshmallow. The toasted side of the second stage marshmallow may be soft and deformable and, therefore, may be cooled at Block 230 before being flipped (e.g., using the flipping unit 130 at Block 232) before proceeding to toast the other side of the second stage marshmallow (Block 235).

The product resulting from toasting at Block 235 may be defined as a third stage marshmallow. At Block 240, the third stage marshmallow may be cooled to room temperature (e.g., between 55 and 85 degrees Fahrenheit) while still being carried by the reception tray 110. At the end of the cooling step at Block 240, the third stage marshmallow may contain moisture introduced during the toasting step (Block 235) as a natural consequence of heating sugar within the product. As a result, the third stage marshmallow may exhibit a state more plastic than chalky. Therefore, to achieve the desired crispy, candy-like texture, at Block 245 the third stage marshmallow may be dried in the dehydration unit 120 at a temperature of approximately 140 degrees Fahrenheit for an additional four (4) hours or until a cooled marshmallow product (per Block 250, to define a final stage marshmallow) may be crushed to a powder. A plurality of final stage marshmallows may be substantially separated into stand-alone (e.g., not stuck together) candies. For example, and without limitation, the flipping unit may operate not only to invert the product for toasting at Block 232, but also may spread the marshmallows in their second stage about the reception tray 110 to prevent joining of adjacent marshmallows during toasting. Also for example, and without limitation, some number of adjacent final stage marshmallows that may be joined (e.g., melted together during toasting and then cooled) may be separated into individual candies to comprise the final stage product. A person of ordinary skill in the art will immediately recognize that sticking together of product may be prevented by spreading any or all of the first stage marshmallows, the second stage marshmallows, and the third stage marshmallows about the reception tray. At Block 255, the packaging unit 150 may be used to vacuum seal the final stage product for storage and shipping. The process ends at Block 299.

A skilled artisan will note that one or more of the aspects of the present invention (e.g., the controller 170) may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 3 illustrates a model computing device 300 in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 3 illustrates an operating system (OS) 634, application programs 635, other program modules 636, and program data 637.

The computer 610 may also include other removable/non-removable, volatile/nonvolatile computer storage media. By way of example only, FIG. 3 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 3, provide storage of computer readable instructions, data structures, program modules and other data for the computer 610. In FIG. 3, for example, hard disk drive 641 is illustrated as storing an OS 644, application programs 645, other program modules 646, and program data 647. Note that these components can either be the same as or different from OS 633, application programs 633, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 3. The logical connections depicted in FIG. 3 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 3 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. Thus the scope of the invention should be determined by the appended claims and their legal equivalents, and not by the examples given.

That which is claimed is:

1. A method of making campfire marshmallow candy derived from a plurality of marshmallows, the method comprising the steps of:
   receiving, using a reception tray, the plurality of marshmallows, defined as raw marshmallows with an original weight, to form a first substantially single layer;
   dehydrating, using the reception tray and a dehydration unit configured to produce a drying temperature between 95 and 155 degrees Fahrenheit, the raw marshmallows, to define first stage marshmallows;
   cooling the first stage marshmallows;
   toasting, using the reception tray and a toasting unit configured to produce a toasting temperature between 200 and 550 degrees Fahrenheit, the first stage marshmallows, to define second stage marshmallows;
   cooling the second stage marshmallows;
   flipping the second stage marshmallows to form a second substantially single layer on the reception tray;
   toasting, using the reception tray and the toasting unit, the second stage marshmallows, to define third stage marshmallows;
   cooling the third stage marshmallows;
   dehydrating, using the reception tray and the dehydration unit, the third stage marshmallows, to define final stage marshmallows; and
   cooling the final stage marshmallows.

2. The method according to claim 1 wherein receiving the plurality of marshmallows comprises receiving a plurality of miniature marshmallows.

3. The method according to claim 1 wherein at least one of dehydrating the raw marshmallows and dehydrating the third stage marshmallows comprises dehydrating at a temperature of approximately 140 degrees Fahrenheit.

4. The method according to claim 3 wherein dehydrating the raw marshmallows comprises dehydrating the raw marshmallows for between 8 and 12 hours at a first atmospheric humidity of between 56 and 62 percent.

5. The method according to claim 3 wherein dehydrating the raw marshmallows comprises dehydrating the raw marshmallows for approximately 16 hours at a second atmospheric humidity of less than 56 percent.

6. The method according to claim 1 wherein dehydrating the raw marshmallows comprises dehydrating the raw marshmallows to approximately 80 percent of the original weight of the raw marshmallows.

7. The method according to claim 1 wherein at least one of toasting the first stage marshmallow and toasting the second stage marshmallow comprises toasting at approximately 500 degrees Fahrenheit.

8. The method according to claim 1 wherein at least one of cooling the first stage marshmallows, cooling the second stage marshmallows, cooling the third stage marshmallows, and cooling the final stage marshmallows comprises cooling to a respective temperature between 55 and 85 degrees Fahrenheit.

9. The method according to claim 8 wherein the method further comprises separating on the reception tray at least one of the first stage marshmallows, the second stage marshmallows, and the third stage marshmallows; wherein, after cooling the final stage marshmallows, said final stage marshmallows are in a crushable powder form.

10. The method according to claim 1 further comprising the step of vacuum sealing, using a packaging unit, the final stage marshmallows.

* * * * *